United States Patent [19]

Higashi et al.

[11] Patent Number: 5,596,516
[45] Date of Patent: Jan. 21, 1997

[54] CODE SEQUENCE GENERATOR

[75] Inventors: Akihiro Higashi, Yokosuka; Koji Ohno; Narumi Umeda, both of Yokohama, all of Japan

[73] Assignee: NTT Mobile Communications Network Inc., Tokyo, Japan

[21] Appl. No.: 428,389

[22] Filed: Apr. 25, 1995

[30] Foreign Application Priority Data

Apr. 27, 1994 [JP] Japan .................................. 6-090353
Apr. 12, 1995 [JP] Japan .................................. 7-087191

[51] Int. Cl.$^6$ ...................................................... G06F 1/02
[52] U.S. Cl. ............................................................ 364/717
[58] Field of Search .................................. 364/717, 717.5

[56] References Cited

U.S. PATENT DOCUMENTS

| | | | |
|---|---|---|---|
| 3,691,472 | 9/1972 | Bohman ................................. | 327/164 |
| 4,685,132 | 8/1987 | Bishop et al. ......................... | 364/717 X |
| 4,847,861 | 7/1989 | Hamatsu et al. ...................... | 364/717 X |
| 5,434,807 | 7/1995 | Yoshida ................................. | 364/717 |
| 5,444,645 | 8/1995 | Yoshida et al. ....................... | 364/717 |
| 5,515,307 | 5/1996 | Aiello et al. .......................... | 364/717 |

FOREIGN PATENT DOCUMENTS 04057407  6/1992  Japan .

OTHER PUBLICATIONS

IBM Technical Disclosure Bulletin, vol. 11, No. 4, Sep. 1968 Yorktown (US), pp. 393–394, Hsiao 'Generating Pseudo Noise Sequences' p. 393, paragraph 1 and p. 394, line 1–last line.

Electronics Letters, vol. 4, No. 19, Sep. 20, 1968 Stevenage, pp. 417–419, M. Hughes 'Transition–Matrix Construction For Pseudorandom Binary–Sequence Generators' p. 417, right col., line 1–line 42.

*Primary Examiner*—Roy N. Envall, Jr.
*Assistant Examiner*—Chuong D. Ngo
*Attorney, Agent, or Firm*—Rogers & Wells

[57] ABSTRACT

A code sequence generator having a register for holding n-bit code, and a calculation circuit for performing matrix calculation on the content of the register, and sequentially generating a code sequence by feeding back the calculation results to the register. The matrix which is set in the calculation circuit is changed by selectively reading a matrix from a memory circuit that stores precalculated matrices. This makes it possible to set a desired register state in a short time even if the desired code sequence is very long, and to generate any code sequences without changing the rate of a clock signal.

5 Claims, 3 Drawing Sheets

CODE SEQUENCE GENERATOR

BACKGROUND OF THE INVENTION

1. Field of the Invention

The present invention relates to a code sequence generator which generates maximum length sequences or Gold sequences.

2. Description of Related Art

Digital code sequences are used in various fields such as cryptography of digital information, and spreading codes for expanding the signal bandwidth of spread-spectrum communications. In particular, the maximum length sequences (M-sequences) is utilized as a random code or a pseudonoise signal because they have a very long period and their autocorrelational characteristics are impulsive.

Digital codes can be generated by using a register and a calculation circuit performing a calculation on the content of the register, and by feeding the computed results back to the register.

For example, the calculation for generating M-sequences with period 15 can be implemented by a single EXCLUSIVE OR circuit, and a simple feedback circuit as shown in FIG. 1.

In FIG. 1, the reference numeral 1 designates a four stage shift register consisting of four registers R1–R4, and the reference numeral 2 designates an EXCLUSIVE OR circuit EXCLUSIVE-ORing the outputs of the registers R1 and R4. The output of the EXCLUSIVE OR circuit 2 is fed back to the input of the register R1. Each of the resistors R1–R4 is set at an initial value (not all initial values are zero) and the contents of the registers R1–R4 are shifted by a clock signal provided thereto, thereby generating an M-sequence code with period 15.

FIG. 2 shows an M-sequence generator with period 15 arranged by generalizing the generator of FIG. 1. This generator includes four 1-bit registers instead of the shift register 1 of FIG. 1. In FIG. 2, the reference numeral 3 designates a register circuit including four 1-bit registers REG1–REG4, and the reference numeral 4 designates a calculation circuit for performing calculation on the contents of the register circuit 3, and feeds the calculated results back to the register circuit 3. The M-sequence is outputted from the output terminal of the register REG4.

In these M-sequence code generators, let us assume that the generation of a code sequence is started after the state of the register circuit 3 is changed by providing it with a given number of clock pulses. For example, to start generation of a code sequence after providing five clock pulses, the five clock pulses must be quickly applied to the register circuit 3 to place it in the start state. In this case, although it will be easy to generate an M-sequence with period 15 from a desired phase, it will take a much longer time to place a register in a desired start state by providing it with a necessary number of clock pulses in order to generate a code sequence with a much longer period from a desired phase.

Furthermore, to generate a code sequence at every other code sequence, it is required to operate the code sequence generator by a clock signal of the double rate in order to select every other code sequence. Accordingly, generating a code sequence at m-code sequence intervals requires to operate the code sequence generator at a clock rate m times faster than a normal rate. Thus, the conventional code sequence generator requires a higher rate clock signal than the normal rate clock signal.

Thus, the prior art requires a very long time to start generating a code sequence from a desired phase when the period of the code sequence is very long. In addition, a higher rate clock signal is necessary to generate a code sequence at a desired interval that is an integer multiple of the code sequence.

SUMMARY OF THE INVENTION

Therefore, an object of the present invention to provide a code sequence generator which can reach a desired start phase in a short time at any cases, and which can generate a code sequence at a desired interval that is an integer multiple of the code sequence by using a clock at a normal rate.

In a first aspect of the present invention, there is provided a code sequence generator for generating a code sequence $Y=A^m X$ by repeating a linear transformation defined by an n×n matrix A to n-bit data X by m times (m is a positive integer), the code sequence generator comprising:

storing means for storing in advance $p_j$-th power of the matrix A, that is, $A^{p_j}$, for each of predetermined t+1 positive integers $p_j$ (j=0, 1, 2, . . . , t);

means for resolving the integer m to a linear combination of the integers $p_j$, that is, $m=k_0+k_1 p_1+k_2 p_2+ \ldots +k_t p_t$ ($k_0, k_1, k_2, \ldots, k_t$ are integers equal to or greater than zero);

selecting means for sequentially selecting matrices $A^{p_0}$, $A^{p_1}, A^{p_2}, \ldots, A^{p_t}$ associated with nonzero ones of the $k_0, k_1, k_2, \ldots, k_t$ from the storing means; and means for performing the following matrix calculation for nonzero ones of the $k_0, k_1, k_2, \ldots, k_t$.

$$Y=(A^{p_0})(A^{p_1})^{k_1}(A^{p_2})^{k_2} \ldots (A^{p_t})^{k_t} X$$

The integers $p_j$ may be determined by sequentially dividing n by 2 as $p_0=1, p_1=n/2, p_2=n/2^2, \ldots, p_t=n/2^t$, and rounding down the results to nearest integers.

The selecting means may comprise n t+1-to-1 line multiplexers operating in parallel.

The selecting means may selectively provide the storing means with an address associated with a matrix to be selected from the matrices $A^{p_j}$.

The selecting means may provide the calculation means with a particular matrix selected from the matrices $A^{p_j}$ so that the code sequence generator generates a code sequence with a desired code interval which is defined as the difference of the values m of the two successive code sequences.

According to the present invention, an i-th state vector $X_i$ (i is a positive integer) of the register circuit of the code sequence generator is changed to an i+1-th state vector $X_{i+1}$ by advancing the state by one step, where $X_{i+1}$ is expressed as follows:

$$X_{i+1}=AX_i$$

where a matrix A represents a calculation procedure. In the conventional technique, a register state at m (m is a positive integer) steps later is expressed as $$X_{i+m}=A^m X_i$$

In other words, m times of multiplications of the matrix A must be performed.

In the code sequence generator in accordance with the present invention, the number of multiplications by the calculation circuit can be reduced. For example, assuming that m is expressed by the following equation.

$$m=k_0+k_1p_1+k_2p_2$$

where $k_0$, $k_1$, $k_2$, $p_1$ and $p_2$ are integers equal to or greater than zero. If we have calculated matrices A, $A^{p_1}$ and $A^{p_2}$ in advance, the register state $X_{i+m}$ at m steps later can be expressed as $$X_{i+m}=A_m X_i=(A^{k_0})(A^{p_1})^{k_1}(A^{p_2})^{k_2}$$

This means that the number of multiplications M is given by $$M=k_0+k_1+k_2$$

Accordingly, the number of multiplications M can be greatly reduced. For example, when m=127, and $p_1$=100 and $p_2$=10, it follows that $k_0$=7, $k_1$=1 and $k_2$=2, and the number of multiplications M=10. A greater reduction in the number of multiplications M will be expected with the increase in the value m.

Furthermore, according to the present invention, combining a plurality of matrices makes it possible to set the register to a desired phase quickly, and then, to start generating a code sequence from the desired phase.

The present invention differs from the conventional technique in that it does not sequentially obtain the next register states step by step, but prepares in advance matrices that represents calculation procedures which gives discontinuous register states.

Furthermore, according to the present invention, a code sequence can be generated at an intended interval without changing the clock rate. Therefore, the present invention is particularly effective when a code sequence is long and a register state separated far apart from the current state is to be set.

The above and other objects, effects, features and advantages of the present invention will become more apparent from the following description of the embodiment thereof taken in conjunction with the accompanying drawings.

DETAILED DESCRIPTION OF PREFERRED EMBODIMENT

The invention will now be described with reference to the accompanying drawings.

Figure 1:
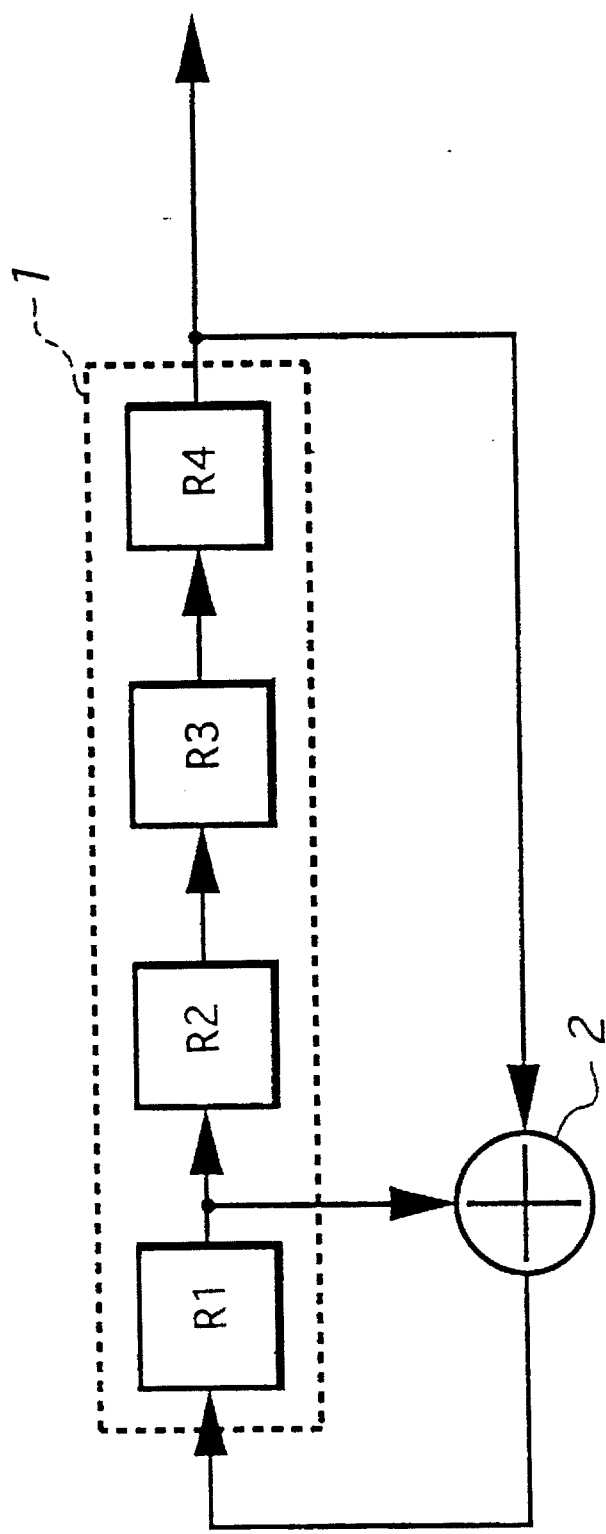
FIG. 1 is a block diagram showing a concrete example of a conventional H-sequence generator with period 15.
Figure 2:
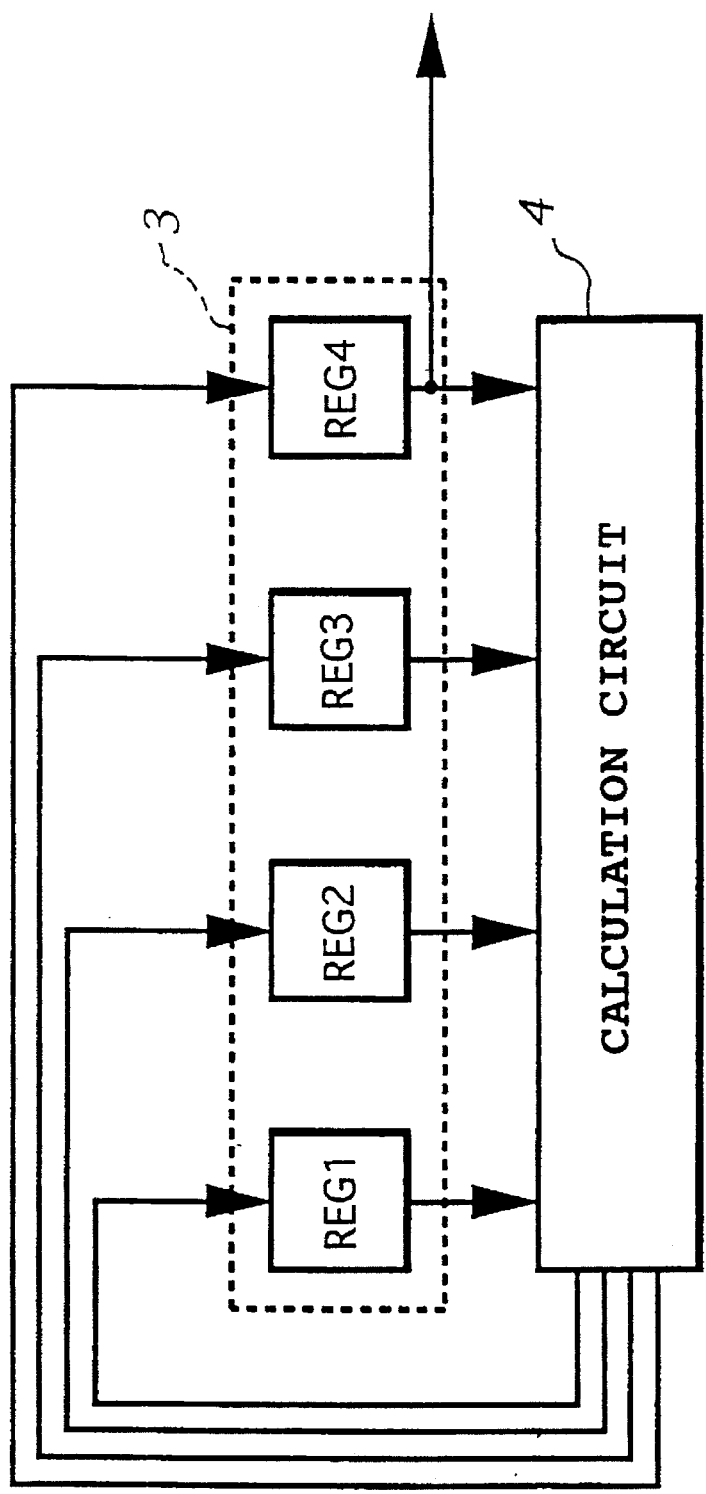
FIG. 2 is a block diagram showing a general arrangement of a conventional H-sequence generator.
Figure 3:
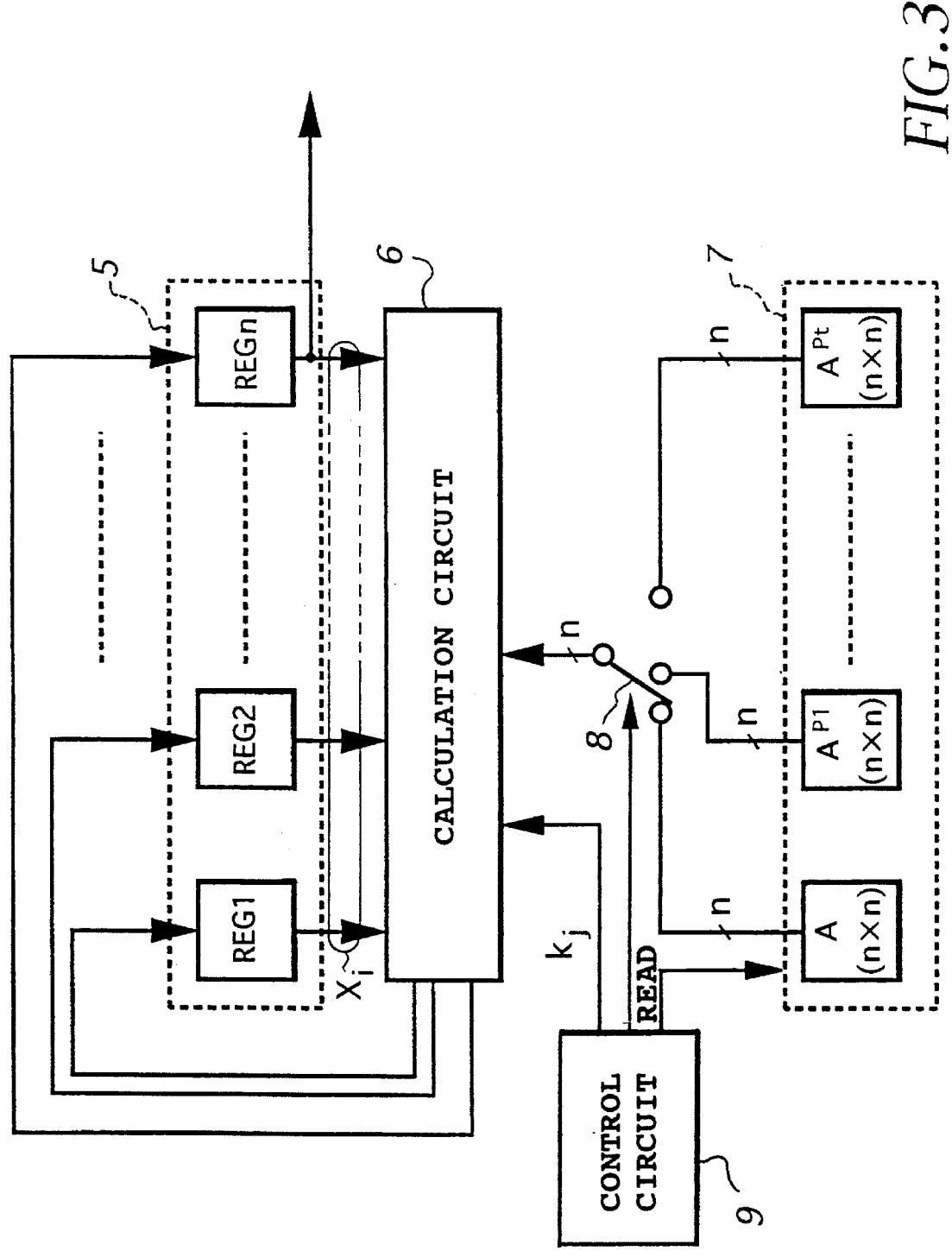
FIG. 3 is a block diagram showing an example of a code sequence generator in accordance with the present invention.

FIG. 3 is a block diagram showing an embodiment of a code sequence generator in accordance with the present invention. In FIG. 3, the reference numeral 5 designates an n-bit register, which includes n 1-bit registers REG1, REG2, ..., REGn. The register 5 holds an n-bit state vector $X_i$ (i is an integer equal to or greater than zero), which is supplied to a calculation circuit 6.

On the other hand, the reference numeral 7 designates a memory circuit which stores t+1 n×n-matrices $A^{p_0}$, $A^{p_1}$, $A^{p_2}$, ..., $A^{p_t}$ in advance. Here, the value t is determined taking account of the capacity of the memory circuit 7 and the degree of simplification of calculation. For example, when t=4 and n=100, $p_j$ (j=0, 1, 2, ..., t=4) is determined as follows: First, since the matrix A is essential, $p_0$ is set at $p_0$=1. Subsequently, sequentially dividing by 2 and rounding down the results to nearest integers gives $p_1$=n/2=50, $p_2$=n/$2^2$=25, $p_3$=n/$2^3$=12, and $p_4$=$p_t$=n/$2^4$=6.

The output data of the memory circuit 7 are provided to t+1 n-bit input terminals of a selecting switch 8. The selecting switch 8 consists of n t+1-to-1 line multiplexers operating in parallel, selects a desired matrix $A^{p_j}$ under the control of a control circuit 9, and sequentially provides the calculation circuit 6 with each row of the selected matrix through the n-bit output terminal of the selecting switch 8. The calculation circuit 6 multiplies the state vector $X_i$ by the matrix $A^{p_j}$ supplied thereto.

The one-step advanced state vector $X_{i+1}$ of the state vector $X_i$ is given by $$X_{i+1}=AX_i \qquad (1)$$

and the m-step advanced state vector $X_{i+m}$ is given by $$X_{i+m}=A^m X_1 \qquad (2)$$

The control circuit 9 resolves m into a linear expression of $p_j$ as follows:

$$m=k_0+k_1p_1+k_2p_2+\ldots+k_tp_t \qquad (3)$$

For example, in the above mentioned example where n=100 and t=4, m=81 can be resolved as follows:

$$m=1\times50+1\times25+6 \qquad (4)$$

This resolution can be easily performed by sequentially dividing m by 2. According to the resolution, the control circuit 9 controls the selecting switch 8 such that a matrix $A^{p_j}$ used in calculation is supplied from the memory circuit 7 to the calculation circuit 6. Then, the control circuit 9 provides the memory circuit 7 with a readout signal so that rows of the matrix $A^{p_j}$ are sequentially read one by one beginning from the top row, and are supplied to the calculation circuit 6 through the selecting switch 8. In addition, the control circuit 9 provides the calculation circuit 6 with information on the number of calculations (multiplications).

With such an arrangement, $A^m X_i$ is expressed as follows using equation (3).

$$A^m X_i=(A)^{k_0}(A^{p_1})^{k_1}\ldots(A^{p_t})^{k_t}X_i \qquad (5)$$

In this case, since $A^{p_j}$ have been calculated in advance and prestored in the memory circuit 7, they can be obtained by only reading them out of the memory circuit 7. Accordingly, $(A^{p_j})^{k_j}$ can be obtained by repeating multiplications of the matrix $(A^{p_j})$ by $k_j$ times. Thus, the calculation of equation (5) can be obtained by $M=k_0+k_1+\ldots+k_t$ multiplications. The calculation result is stored into the register 5, and is outputted from therefrom.

Taking account of the fact that the multiplications of the matrix A is repeated m times in the conventional technique, it will be clear that the calculation amount can be greatly reduced. For example, when m=81, M=1+1+6=8 from equation (4). This means that only eight times of multiplications can provide a desired result.

Although the matrix $A^{p_j}$ which is to be supplied to the calculation circuit 6 is selected by the selecting switch 8 in this embodiment, the matrix can be selected by providing the memory circuit 7 with address information from the control circuit 9. In this case, the selecting switch 8 can be obviated, and the control circuit 9 bears the function of a selecting means.

Furthermore, the speed of calculation can be increased with the increase of the value t in this embodiment. However, this will increase the number of matrices which must be calculated in advance, and requires a memory circuit of larger capacity. In addition, providing a fixed matrix $A^{p1}$ from the memory circuit 7 to the calculation circuit 6 makes it possible to produce state vectors by every p1 steps. In addition, although the embodiment employs only one calculation circuit 6, and sets one of a plurality of matrices thereto by reading it out of the memory circuit 7, it may be possible to employ a plurality of calculation circuits, each associated with one of the matrices, and perform calculations by combining these calculation circuits.

Moreover, a desired register state can be quickly reached in this embodiment. As a result, a given phase of a code sequence can be achieved in a short time so that the code sequence can be generated from that phase. In addition, code sequences can be generated at a desired interval without using a clock signal of a higher rate. Thus, the present invention is particularly effective in setting register states associated with a long code sequence and separated by a large number of steps.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A code sequence generator for generating a code sequence $Y=A^m X$ by repeating a linear transformation defined by an n×n matrix A to n-bit data X by m times (m is a positive integer), said code sequence generator comprising:

storing means for storing in advance $p_j$-th power of said matrix A, that is, $A^{p_j}$, for each of predetermined t+1 positive integers $p_j$ (j=0, 1, 2, ..., t);

means for resolving said integer m to a linear combination of said integers $p_j$, that is, $m=k_0+k_1 p_1+k_2 p_2+ \ldots +k_t p_t$ ($k_0, k_1, k_2, \ldots, k_t$ are integers equal to or greater than zero);

selecting means for sequentially selecting matrices $A^{p_0}$, $A^{p_1}, A^{p_2}, \ldots, A^{p_t}$ associated with nonzero ones of said $k_0, k_1, k_2, \ldots, k_t$ from said storing means; and means for performing the following matrix calculation for nonzero ones of said $k_0, k_1, k_2, \ldots, k_t$, $$Y=(A^{p_0})(A^{p_1})^{k_1}(A^{p_2})^{k_2} \ldots (A^{p_t})^{k_t} X$$

2. The code sequence generator as claimed in claim 1, wherein said integers $p_j$ are determined by sequentially dividing n by 2 as $p_0=1$, $p_1=n/2$, $p_2=n/2^2$, ..., $p_t=n/2^t$, and rounding down the results to nearest integers.

3. The code sequence generator as claimed in claim 2, wherein said selecting means comprises n t+1-to-1 line multiplexers operating in parallel.

4. The code sequence generator as claimed in claim 2, wherein said selecting means selectively provides said storing means with an address associated with a matrix to be selected from said matrices $A^{p_j}$.

5. The code sequence generator as claimed in claim 1, wherein said selecting means provides said calculation means with a particular matrix selected from said matrices $A^{p_j}$ so that said code sequence generator generates a code sequence with a desired code interval which is defined as the difference of the values m of the two successive code sequences.

\* \* \* \* \*